May 28, 1968  F. ZUMBO  3,385,627
TOGGLES IN LINKED CONNECTION AT THE END OF A CHAIN OR THE LIKE
Filed Feb. 3, 1967
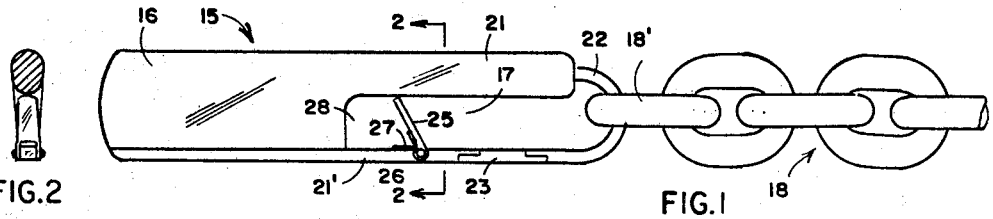
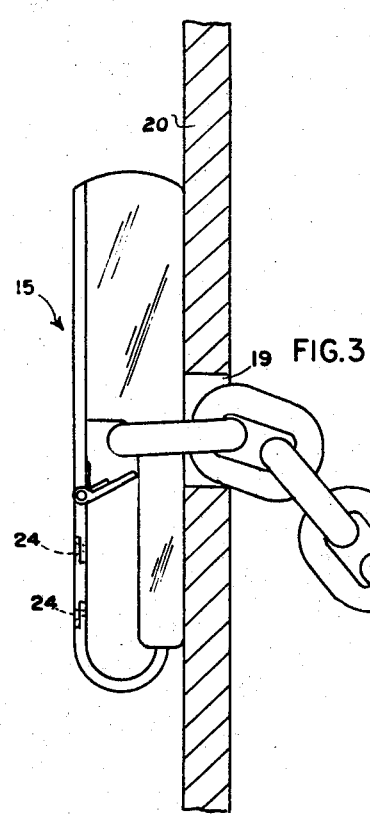
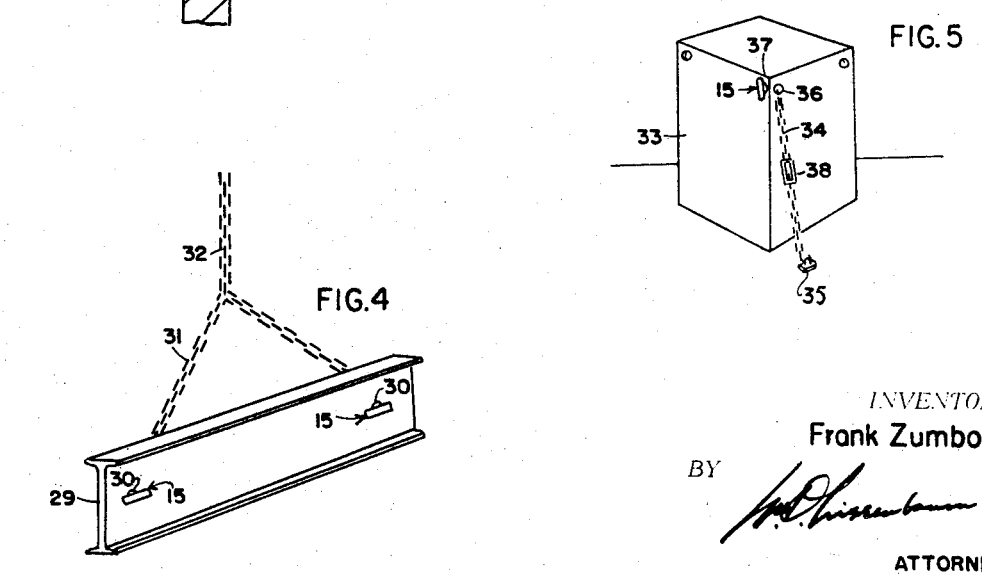
INVENTOR,
Frank Zumbo,
BY
ATTORNEY.

United States Patent Office 3,385,627
Patented May 28, 1968

3,385,627
TOGGLES IN LINKED CONNECTION AT THE END
OF A CHAIN OR THE LIKE
Frank Zumbo, 1938 E. 1st St.,
Brooklyn, N.Y. 11215
Filed Feb. 3, 1967, Ser. No. 613,833
7 Claims. (Cl. 294—93)

ABSTRACT OF THE DISCLOSURE

A toggle bar having a longitudinal slot extending from its middle region to near one end thereof whereby said bar end is a bight connecting two runs spaced by said slot. The end link of a chain associated with the bar is capable of movement on and along the bight and each of said runs. The transverse cross-section of one run is substantially that of the stock a chain link is made of. Said bar is capable of passing through any hole the chain is capable of being passed through and is of a length to lie across the hole and extend beyond it at both ends. There is a means to releasably hold the chain at the middle region of the bar. A section of a run is releasably secured, and when moved, affords entrance and removal of the chain from the slot.

The present invention relates to toggles of the class comprising a short bar in connection with a chain or the like, designed to pass through a hole or eye and turned, whereupon the chain extending from the middle region of the bar, is in angular relation therewith, and anchored.

Heretofore, the bulk at the connection of the bar and chain, required that the hole size need be much larger than the size of a hole through which the chain alone could pass. Engineering-wise, the smaller the hole is, the firmer the hold is and less is the tendency of the toggle to buckle. In many places the hole must be small to avoid weakening of the structure it is in, or in which larger holes are impractical or undesirable, as for instance holes provided in the walls of large shipping containers or in beams, for the attachment of lifting-chains or lashes.

It is therefore the principal object of this invention to provide a novel and improved toggle of the class mentioned, which can pass through a hole of the size the chain can pass through.

Another object thereof is to provide that the strength of the connection of the bar to the chain when the toggle is in use condition, shall be at least equal to the strength of the chain.

A further object is to provide a novel and improved toggle of the character described, which is simple in construction, easy to use, reasonable in cost to manufacture and efficient in carrying out the purposes for which it is designed.

Other objects and advantages will become apparent as this disclosure proceeds.

In the accompanying drawing forming part of this specification, similar characters of reference indicate corresponding parts in all the views.

FIG. 1 is an elevational view of a preferred form of toggle embodying the teachings of this invention. The toggle is shown at the end of a chain, in extension thereof, ready to be threaded through a hole.

FIG. 2 is a section taken at line 2—2 in FIG. 1.

FIG. 3 shows the device in use.

FIG. 4 is a pictorial view of a beam, and diagrammatically shown are two toggles and their chains associated therewith, in an arrangement used for lifting or lowering the beam.

FIG. 5 is a similar view showing a toggle and its chain used as a lash to hold a heavy container firm to the ground.

In the drawing, the numeral 15 designates generally a toggle which essentially is a bar 16 having a longitudinal slot 17, which commences from near one end and extends to the middle region of said bar. This bar can pass through any hole, moving longitudinally therethrough, that can pass the chain 18 therethrough. This slotted bar is associated with the chain whereby it is its first link. Of course, said bar is of a length many times that of a chain link 18', and long enough when the device is in use as in FIG. 3, to be across the hole 19 and beyond it at both sides when turned to rest against the body 20, the hole is in. The thickness of the bar 16 is that of a chain link 18', along one of its longitudinal margins, and may be thinned towards its other longitudinal margin. It is preferred that the width of the thicker run 21 along the slot 17, shall be even more than the thickness of the bar, but of a size to enter the link 18' as shown in FIG. 3. The width of the slot is larger than the thickness of the link 18'. This makes the width of the run 21', rather small in cross section. The mentioned bar end is also of this small cross section and formed as a semi-circular bight 22. This bight and the part 21', may be made of a stiff steel wire bent in J-form, whose longer leg extends to the other end of the bar, and all in one piece which is made unitary with the bar by being welded thereto. A section 23 of this J-shaped piece, may be made removable to admit the link 18' for association with the device 15. This section is attached by means of the countersunk flat head screws 24. A stop finger 25 which is within the confines of the part 21, is pivotally mounted by an axis pin 26, to the part 21', and extends across the slot 17. The length of this finger exceeds the width of the slot; said finger extending across the slot and is biased by a spring 27 to swing upwardly so it normally rests against the part 21 and can swing downwardly to lie along the part 21', in a direction away from the bight 22. When said finger is swung downward, the link 18' can pass it to lie at the inward end of the slot, in the space 28.

To use the device 15, the link 18' is set in the bight 22, as in FIG. 1. The bar 16 is then threaded through the hole 19, and turned so the link 18' admits and slides along the part 21 to the inner end of the slot 17. During such travel, the link 18' upon being intercepted by the finger 25, will swing it downward to pass into the space 28. The spring 27 will restore the finger to its rest position as shown in FIG. 1. Pulling on the chain 18 at its link 18", will set the bar 16 across the hole 19, and said bar will come to rest against the body 20, as shown in FIG. 3.

To lift a beam 29, it is provided with the holes 30 to receive the toggles 15 in the manner of FIG. 3. The toggles here, are at the ends of a chain 31 formed into an inverted V-form, at whose apex there is attached the lifting chain 32 depending from a crane, not shown.

To tie down a container 33, the toggle 15 is at the end of a lash 34, which is anchored to ground by a hook and eye as shown at 35; the bar 15 being threaded through the holes 36, 37, and turned as in FIG. 3. The lash may be of the type which includes a turnbuckle 38 to make it taut.

Although I have shown the toggle 15 in use with a chain, it is evident that it may be used by mounting it on a loop or eye at the end of a cable or rope, which is readily understandable without the necessity for further illustration. Such loop or eye may be called a ring, and so may the chain link 18' which is attached to the toggle 15. Of course, the loop or eye must be able to pass through the hole the toggle is to be passed through.

In the appended claims, the term "ring" is used so the protection afforded by the patent shall encompass the use of the toggle with either a chain, rope or cable, and the like.

This invention is capable of numerous forms and various applications without departing from the essential features herein disclosed. It is therefore intended and desired that the embodiment shown herein shall be merely descriptive and shall not be deemed restrictive, and that the patent shall cover all patentable novelty herein set forth; reference being had to the following claims rather than to the specific showing and description herein to indicate the scope of this invention.

I claim:

1. In an article of the character described, the combination with a ring which is at the end of an elongated pliable member, a comparatively short bar having a longitudinal slot commencing from its middle region and extending to near one end thereof whereby said bar end is a bight connecting a first run and a second run spaced by said slot; said ring and bar being associated in the manner of links of a chain; said ring being capable of movement on and along the bight and each of said runs respectively; said bar being capable of passing through any hole which said ring and elongated member can pass through; the length of said bar being sufficient to extend across the hole with the end portions of said bar extending beyond the hole.

2. An article as defined in claim 1, wherein the transverse cross-section of the bight and that of the first run are comparatively small respectively in relation to the transverse cross-section of the second run.

3. An article as defined in claim 2, wherein the first run has a movable section which is releasably secured to constitute a part thereof; said section when moved, causing an opening in this run for the admission and removal of said ring from the slot.

4. An article as defined in claim 1, wherein the bar has a movable section which is releasably secured to constitute a part thereof; said section when moved, causing an opening for the admission and removal of said ring from the slot.

5. An article as defined in claim 1, wherein the elongated member is a chain and the ring is one of its links; the transverse cross-section of one of the runs along the slot of the bar being substantially equal to the transverse cross section of the stock a chain link is made of.

6. An article as defined in claim 1, including a finger element positioned within and across the slot; said finger element being pivotally connected at one end to one of said runs near the inner end of the slot and extending to the other run in the direction towards the inner end of the slot; said swingable finber being swingable away from the bight to admit said ring between it and the inner end of the slot whereupon when said element is returned to its position across the slot, the ring will remain at the middle region of the bar.

7. An article as defined in claim 6, including spring means biasing said swingable finger to its position across the slot.

References Cited

UNITED STATES PATENTS

| | | | |
|---|---|---|---|
| 1,890,734 | 12/1932 | Kuberka | 294—97 X |
| 2,584,124 | 2/1952 | Gustafson | 294—93 |
| 3,132,890 | 5/1964 | Beaudet | 294—86 |

ANDRES H. NIELSEN, *Primary Examiner.*